June 11, 1968     E. F. MORAN     3,387,555

PORTABLE POWER OPERATED BARBECUE APPARATUS

Filed July 28, 1965

*INVENTOR.*
EDWARD F. MORAN
BY
*Hoffmann and Yount*
ATTORNEYS

United States Patent Office 3,387,555
Patented June 11, 1968

3,387,555
PORTABLE POWER OPERATED BARBECUE APPARATUS
Edward F. Moran, 510 Park Ave.,
Perkasie, Pa. 18944
Filed July 28, 1965, Ser. No. 475,363
5 Claims. (Cl. 99—421)

ABSTRACT OF THE DISCLOSURE

A portable, generally horizontally disposed, rotary, power operated, barbecue spit supported by a vertically adjustable support means and which is horizontally adjustable and swivellable in a generally horizontal plane relative to the vertical support means is provided. Also, a battery operated barbecue spit having a unitary drive assembly including a motor and gear reduction unit mounted on a support plate which is removably mounted between a pair of detachably connected housing sections is provided.

---

The present invention relates to a barbecue apparatus and more particularly to a portable power operated barbecue apparatus for use with an open fire.

An important object of the present invention is to provide a new and improved portable power operated barbecue apparatus which can be used both indoors and outdoors, which can be readily transported and rapidly set up for operation over an open fire and which is so constructed and arranged that it can be swung relative to its support in a horizontal plane toward and from the fire and can be readily adjusted both horizontally and vertically toward and from the fire.

Another object of the present invention is to provide a new and improved portable power operated barbecue apparatus of the character described which is of a relatively simple and compact construction, self-contained, durable and economical to manufacture.

Yet another object of the present invention is to provide a new and improved portable power operated barbecue apparatus of the character described which comprises a battery housing containing one or more batteries therein, a tubular support housing axially spaced from the battery housing, and a drive assembly housing connected at its opposite ends to the battery and support housings, the drive assembly housing supporting a unitary drive assembly therein for rotating a foodholder operatively connected therewith and rotatably supported by the support housing, and which housings are so constructed and arranged that they can be readily detached and attached to one another and which drive assembly housing is constructed such that assembly and disassembly of this unitary drive assembly can be readily effected.

A further object of the present invention is to provide a new and improved portable power operated barbecue apparatus as defined in the next preceding object wherein the battery, drive assembly and support housings are annular and coaxially arranged on a common axis and wherein the battery housing serves as a handle for swinging the foodholder relative to a vertical support in a horizontal plane toward and from an open fire.

Other novel characteristics, objects and advantages of this invention will be apparent in the following detailed description and in the accompanying drawings forming a part of this specification and in which.

Figure 1:
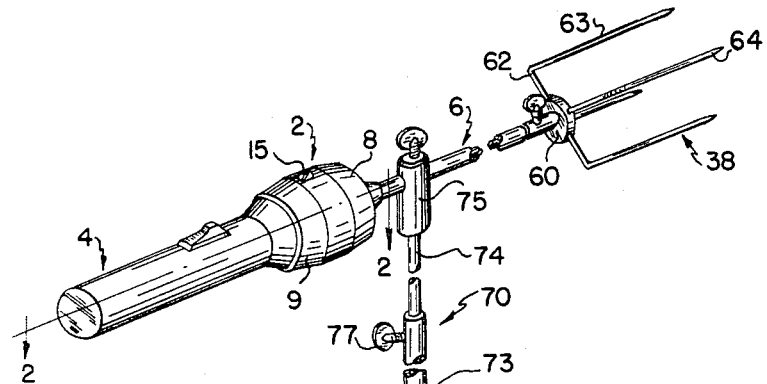
FIG. 1 is a fragmentary perspective view of the preferred embodiment of the portable power operated barbecue apparatus of the present invention.
Figure 2:
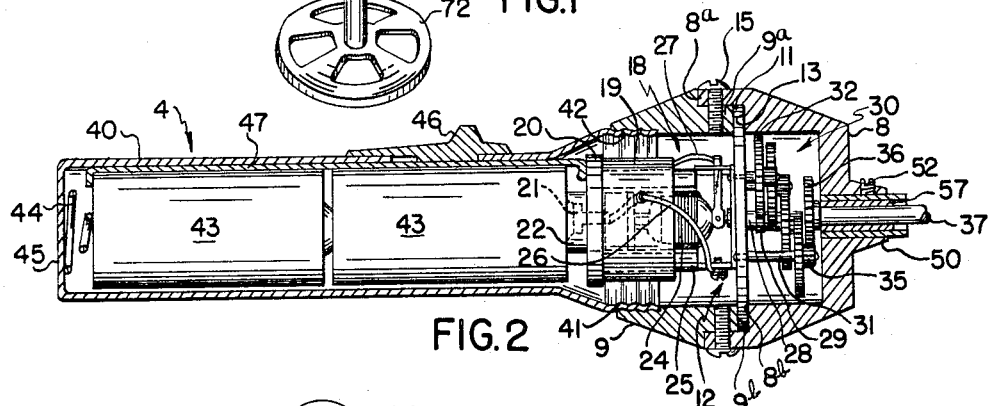
FIG. 2 is a vertical sectional view taken along line 2—2 of FIG. 1.
Figure 3:
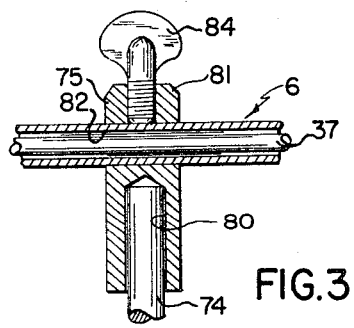
FIG. 3 is a fragmentary sectional view of part of the portable power operated barbecue apparatus shown in FIG. 1.
Figure 4:
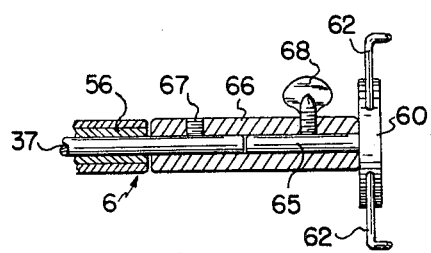
FIG. 4 is a fragmentary sectional view of part of the portable power operated barbecue apparatus shown in FIG. 1.

Referring to the drawings, a preferred embodiment of the portable power operated barbecue apparatus is there shown. The barbecue apparatus comprises a drive assembly housing 2 of suitable metal or other material having its opposite ends detachably connected to a battery housing 4 and a tubular support member or housing 6. The housing 2 comprises a pair of annular, generally complementary shaped detachably connected sections 8 and 9, which when connected together define a chamber therebetween. The sections 8 and 9 have adjacent overlapping end portions 8ª and 9ª and axially spaced apart inwardly extending confronting portions 8ᵇ and 9ᵇ for clamping a transversely extending mounting plate 11 of a unitary drive assembly 12 therebetween when the sections 8 and 9 are connected together. The end portion 9ª of the section 9 is circumferentially rabbeted and slidably received within a counterbore 13 in the end portion 8ª of the section 8, the spaced confronting portions 8ᵇ and 9ᵇ being defined by the bottom of the counterbore 13 and the end face of the end portion 9ª. Screws 15 threadably engaged with threaded openings in the end portion 9ª and extending outwardly through aligned openings in the end portion 8ª are provided for detachably connecting the sections 8 and 9 together.

The mounting plate 11 of the unitary drive assembly 12 is slidably received in the counterbore 13 and has its outer marginal portions disposed and clamped between the confronting portions 8ᵇ and 9ᵇ when the sections 8 and 9 are connected together. The unitary drive assembly 12 includes an electric motor 18 mounted on the mounting plate 11 and extending rearwardly therefrom toward the battery housing 4. The motor 18 may be of any suitable or conventional construction and is concentrically mounted within the housing 2. Secured to the motor 18 and surrounding the rearward portion thereof is a plastic cup-shaped member 19. The member 19 carries on its outer periphery at its rearward end an annular contact ring 20 and carries a contact element 21 centrally located on its rear side 22. The contact ring 20 and the contact element 21 are operatively interconnected with the rotor and stator elements 24 and 25 of the motor 18 by wires 26 and 27 respectively. The motor 18 has an output shaft 28 projecting through a central aperture in the plate 11. Fixed to the output shaft 28 is a drive gear 29.

The unitary drive assembly 12 further includes a gear reduction unit 30 supported by the mounting plate 11. The gear reduction unit 30 comprises a plurality of gears rotatably journaled on pins or shafts 31 fixed to and extending forwardly of the mounting plate 11. The gears of the gear reduction unit are operatively intermeshed with one another and include an input gear 32 in meshed engagement with the drive gear 29 and an output gear 35 in meshed engagement with a gear 36 fixed to a drive shaft 37 for rotating the foodholder 38, as will hereinafter be more fully described.

The battery housing 4 is here shown comprising a conventional flashlight casing or handle 40 having an externally threaded forward end portion 41 threadably engaged with an internally threaded rearward end portion 42 of the section 9 of the drive assembly housing 2. The casing 40 which is concentric with the housing 2, supports therein a plurality of dry cell batteries 43 which are urged forwardly into engagement with the contact element 21 by a compression spring 44 having its opposite ends abutting against the casing 40 at its rearward end 45 and the rearwardmost battery 43. A thumb switch 46 slidably mounted on the casing 40 is provided for selectively energizing the motor 18. The switch 46 includes an axially extending contact finger 47 which is in constant operative engagement with the batteries 43 and which is movable relative to the casing 40 between a first position in which the finger 47 engages the contact ring 20 to complete an electric circuit between the batteries 43 and motor 18 to energize the latter and a second position in which it does not engage the contact ring 20 to break the circuit between the batteries 43 and motor 18 to deenergize the latter.

From the foregoing, it will be apparent that when the switch 46 is moved forwardly to move the contact finger 47 into engagement with the contact ring 20, an electric circuit between the batteries 43 and the motor 18 is completed to energize the latter. Energization of the motor 18 causes the output shaft 28 and the drive gear 29 to be rotated. Rotation of the drive gear 29 via the gear reduction unit 30 causes the gear 36 and the drive shaft 37 for rotating the foodholder 38 to be rotated. The gear reduction unit 30 functions to rotate the foodholder 38 at a speed which is considerably less than the speed of the output shaft 28 of the motor.

The tubular member or housing 6 at its rearward end is disposed through an opening provided in a forwardly extending portion 50 of the section 8 of the housing 2 and is detachably connected thereto via one or more set screws 52. The tubular member 6 is coaxial with the housing 2 and supports the drive shaft 37, the latter being rotatably journaled in bushings 56 and 57 fixed within the forward and rearward ends of the tubular member 6. The drive shaft 37 at its rearward end projects into the chamber 10 defined by the sections 8 and 9 and has fixed thereto the gear 36 which gear is in constant mesh with the output gear 35 of the gear reduction unit 30. The forward end of the drive shaft 37 projects outwardly or forwardly of the member 6.

Detachably connected to the drive shaft at its forward end is the foodholder 38, here shown as a fork having a hub in the form of a disk 60 from which a plurality of tines 62 radiate. The tines 62 are bent forwardly at right angles to provide spaced, parallel, forwardly projecting prongs 63 which terminate at their free ends in penetrating points 64 to facilitate impaling the food to be barbecued. Fixed centrally to the disk 60 is a rearwardly projecting shaft 65 which is adapted to be detachably connected to the drive shaft 37 by a tubular coupling or sleeve 66. One end portion of the sleeve 66 is detachably connected to the drive shaft 37 by a set screw 67 and the other end portion is removably or detachably connected to the shaft 65 of the foodholder 38 by a thumbscrew 68.

The barbecue apparatus includes an adjustable vertical support means 70 operatively connected with the tubular member 6 for supporting the apparatus thus far described at an elevation and for swing movement in a generally horizontal plane so that the foodholder 38 can be readily moved toward and from the fire. The vertical support means 70 comprises a spider-like base 72 having a generally concave undersurface and a pair of vertically extending telescoping members 73 and 74. As best shown in FIG. 1, the member 73 is tubular and threadably connected at its lower end to the base 72. The member 74 is a rod having its lower end portion slidably received in the tubular member 73 and its upper end swivelly connected with an adapter 75 detachably secured to the tubular member 6. A thumb screw 77 threadably engaged within a threaded opening in the member 73 is provided for positioning the rod 74 relative to the member 73.

The adapter 75 includes a socket or opening 80 at its lower end portion which swivelly or rotatably receives the upper end of the rod 74. The adapter 75 further includes an upper end portion 81 having a transverse opening 82 therethrough which slidably receives the tubular member 6. A thumbscrew 84 threadably engaged with a threaded opening in the upper end portion 81 of the adapter 75 is provided for securing the tubular member 6 in adjusted position relative to the adapter 75.

It will of course be understood that other or different types of foodholders could be employed if desired.

From the foregoing, it is apparent that a novel self-contained portable, power operated barbecue apparatus which can be easily transported and rapidly assembled and set up for operation over an open fire has been provided. Moreover, it is apparent that a novel barbecue apparatus which can be readily adjusted both vertically and horizontally toward and from the fire and swung relative its vertical support toward and from an open fire has been provided. Additionally, it is apparent that a novel barbecue apparatus having concentric readily detachable battery, drive assembly and horizontal support housings has been provided. Furthermore, it can be seen that a novel barbecue apparatus having a unitary drive assembly mounted in a drive assembly housing in a novel manner has been provided.

While the preferred embodiment of the present invention has been described in considerable detail, it is hereby my intention to cover all constructions, modifications and arrangements which fall within the ability of those skilled in the art and within the scope and spirit of the present invention.

Having described my invention, I claim:

1. A portable power operated barbecue spit comprising a battery housing supporting at least one battery therein, a tubular member spaced from the battery housing, a drive assembly housing having one end attached to said tubular member and the other end detachably connected to said battery housing, said drive assembly housing comprising a pair of generally complementary shaped hollow sections having adjacent cooperable end portions, readily removable means connecting the adjacent cooperable end portions of said sections together to form a chamber intermediate said battery housing and said tubular member, a unitary drive assembly disposed within said chamber including a transversely extending mounting plate clamped between said end portions when said sections are connected together, an electrically energizable drive motor mounted solely on said plate on its side facing the battery housing and having a drive shaft projecting through an aperture in said plate toward said tubular member, a drive gear fixed to said drive shaft, an output shaft rotatably supported within said tubular member and having its inner end projecting into said chamber, a driven gear fixed to said output shaft at its inner end, a set of reduction gears supported solely by said plate and disposed between said plate and said tubular member and operatively connected with the drive and driven gears to drivingly interconnect said drive and driven gears, a food holder, means for detachably connecting said food holder to said output shaft at its outer end, and selectively operable switch means on one of said housings for operatively connecting said battery and said drive motor to energize the latter whereby rotation of said output shaft and food holder is effected.

2. A portable power operated barbecue spit as defined in claim 1 wherein said battery housing comprises a flashlight casing threadably connected to said drive assembly housing and wherein said switch is mounted on said casing and is movable between a first position in which it contacts a contactor element on the motor to complete an electric circuit between the motor and battery and a second position in which it is not in contact with the contactor element and thereby breaks the electric circuit between the battery and the motor, and wherein said battery housing, said drive assembly housing and said tubular member are coaxial with one another, and wherein said complementary shaped hollow sections having annular overlapping end portions and inwardly extending confronting portions between which the transversely extending mounting plate is clamped.

3. A portable power operated barbecue spit comprising a base, a vertically adjustable vertical support means having one end detachably connected to said base, an adapter swivelly mounted to the other end of said vertical support means, horizontal support means comprising a tubular member slidably received within a through opening in said adapter, a drive assembly housing containing a unitary drive assembly and connected at one end to said tubular member, an elongated battery housing supporting at least one battery therein detachably connected to said drive assembly housing at its other end, a shaft rotatably supported within said tubular member and having its inner end projecting into said drive assembly housing, said unitary drive assembly comprising an electrically energizable electric motor and a gear reduction unit, means for operatively connecting said gear reduction unit to the inner end of said shaft, means for detachably connecting a food holder to the shaft at its outer end, selectively operable switch means on one of said housings for operatively connecting said battery and said drive motor to energize the latter whereby rotation of said shaft and food holder is effected, and means for adjusting the height of said vertical support means, said swivel connection between said adapter and said vertical support means permitting said battery housing to be grasped and said barbecue spit to be swung relative to said vertical support means in a horizontal plane.

4. A portable power operated barbecue spit comprising a battery housing supporting at least one battery therein, a tubular member spaced from the battery housing, a drive assembly housing having one end attached to said tubular member and the other end detachably connected to said battery housing, said drive assembly housing comprising a pair of generally complementary shaped hollow sections having adjacent cooperable end portions, readily removable means connecting the adjacent cooperable end portions of said sections together to form a chamber intermediate said battery housing and said tubular member, a unitary drive assembly disposed within said chamber including a transversely extending mounting plate clamped between said end portions when said sections are connected together, an electrically energizable drive motor mounted on said plate on its side facing the battery housing and having a drive shaft projecting through an aperture in said plate toward said tubular member, a drive gear fixed to said drive shaft, an output shaft rotatably supported within said tubular member and having its inner end projecting into said chamber, a driven gear fixed to said output shaft at its inner end, a set of reduction gears supported by said plate and located between said plate and said tubular member and operatively connected with the drive and driven gears to drivingly interconnect said drive and driven gears, means for detachably connecting a food holder to said output shaft at its outer end, selectively operable switch means on one of said housings for operatively connecting said battery and said drive motor to energize the latter whereby rotation of said output shaft and food holder is effected, a vertical support means for supporting said tubular member in a generally horizontal plane, said vertical support means comprising a base, a pair of telescoping members, one of which is connected to said base and the other of which is operatively connected to said tubular member, means for adjusting the position of said telescoping members relative to each other and thereby the vertical height of said tubular member and food holder, and an adapter swivelly connected to said other telescoping member and having an opening therethrough for slidably receiving said tubular member whereby said tubular member can be adjustably positioned in said opening relative to said vertical support means and said tubular member and food holder can be swung relative to the vertical support means toward and from an open fire by manually grasping said battery housing.

5. A portable, power operated barbecue spit comprising a vertically adjustable support means, an adapter means swivelly mounted on said vertical support means at its upper end for rotation about a generally vertical axis, a horizontally disposed support means comprising a tubular member slidably received within a through opening in said adapter means to enable said tubular member to be adjustably positioned horizontally relative to said vertical support means, a drive assembly housing connected to said tubular member, a drive assembly supported by said drive assembly housing, a shaft rotatably supported within said tubular member and having its inner end projecting into said drive assembly housing, said drive assembly comprising an electrically energizable electric motor and a gear reduction means and with said gear reduction means being operatively connected with said motor and the inner end of said shaft, means for detachably connecting a food holder to the shaft at its outer end, said electric motor when energized effecting rotation of said shaft and food holder through said gear reduction means, and means for adjusting the height of said vertical support means, said swivel connection between said adapter means and said vertical support means permitting said barbecue spit to be swung relative to said vertical support means in a generally horizontal plane.

References Cited

UNITED STATES PATENTS

| | | | |
|---|---|---|---|
| 3,135,137 | 6/1964 | Cunningham | 77—7 |
| 1,828,903 | 10/1931 | Moretti | 310—50 X |
| 2,758,326 | 8/1956 | Keely et al. | 15—23 |
| 2,827,848 | 3/1958 | Alden | 99—421 |
| 2,972,160 | 2/1961 | Hahn | 15—412 X |
| 3,213,305 | 10/1965 | Riley et al. | 310—50 |
| 3,214,861 | 11/1965 | Arther | 15—344 X |
| 3,181,453 | 5/1965 | Moran | 99—349 |

FOREIGN PATENTS

| | | |
|---|---|---|
| 1,270,368 | 7/1961 | France. |
| 956,936 | 4/1964 | Great Britain. |
| 344,538 | 3/1960 | Switzerland. |
| 365,349 | 12/1962 | Switzerland. |

WALTER A. SCHEEL, *Primary Examiner.*

J. M. NEARY, *Assistant Examiner.*